United States Patent [19]

Janssen et al.

[11] 3,891,800

[45] June 24, 1975

[54] LINE TIME BASE IN A TELEVISION RECEIVER

[75] Inventors: Peter Johannes Hubertus Janssen; Johannes Simon Albert van Hattum; Jan Abraham Cornelis Korver, all of Emmasingel, Eindhoven, Netherlands

[73] Assignee: U.S. Philips Corporation, New York, N.Y.

[22] Filed: Oct. 2, 1973

[21] Appl. No.: 402,845

Related U.S. Application Data

[63] Continuation of Ser. No. 228,982, Feb. 24, 1972, abandoned.

[30] Foreign Application Priority Data

Mar. 16, 1971 Netherlands ........................ 7103465

[52] U.S. Cl. .......................................... 178/69.5 TV

[51] Int. Cl. .............................................. H04n 5/04

[58] Field of Search. 178/69.5 TV, 69.5 DC, 69.5 G

[56] References Cited

UNITED STATES PATENTS

| | | | |
|---|---|---|---|
| 2,545,346 | 3/1951 | Edelsohn | 178/69.5 TV |
| 2,906,818 | 9/1959 | Goodrich | 178/69.5 TV |
| 3,070,753 | 12/1962 | Smeulers | 178/69.5 TV |
| 3,074,027 | 1/1963 | Rout | 178/69.5 TV |
| 3,334,182 | 8/1967 | Legler | 178/69.5 TV |
| 3,368,035 | 2/1968 | Dennison | 178/69.5 TV |
| 3,528,026 | 9/1970 | Groendycke | 178/69.5 LB |

*Primary Examiner*—Robert L. Griffin
*Assistant Examiner*—George G. Stellar
*Attorney, Agent, or Firm*—Frank R. Trifari; Henry I. Steckler

[57] ABSTRACT

A line time base in a television receiver including two circuits for the indirect synchronisation. The first circuit reacts slowly to the line synchronising pulses received from the transmitter whereas the second circuit reacts rapidly to the variations of the line output signal. Such variations occur, for example, in case of variations of the luminosity when the line output transistor is a high voltage transistor. The second circuit ensures that the signal originating from the first circuit occurs in the middle of the line scan period.

11 Claims, 11 Drawing Figures

LINE TIME BASE IN A TELEVISION RECEIVER

This is a continuation of application Ser. No. 228,982, filed Feb. 24, 1972 now abandoned.

The invention relates to a line time base in a television receiver comprising a television display tube and a line deflection coil for writing lines on the screen of the tube, said line time base including a line synchronizing circuit provided with a comparison stage, a lowpass filter and an oscillator, a reference signal being compared in frequency and/or phase with the received line synchronizing pulses in the comparison stage so as to obtain in the synchronized state a fixed phase relationship during the line flyback period between the reference signal and the received line synchronizing pulses, and a switching element switching at the line frequency.

Such a line synchronizing circuit, a so-called circuit for the indirect synchronization in which the comparison stage is generally a phase discriminator, is generally used. It has the advantage that it is not very sensitive to incoming interference signals and to noise which are often difficult no distinguish from the useful synchronizing signals.

When final transistors which are suitable for high voltages are used in line time bases the problem of the delay period of switching off occurs, i.e. the period of time elapsing between the instant when the transistor is driven by the switch-off signal and the instant when it is actually switched off. This delay is caused by the period which is required for the depletion of the excess charge carriers present in the transistor. This effect has been described in U.S. Pat. No. 3,631,314. The line output circuit supplies energy to the line deflection coil and generally also to the EHT generator which generates the EHT for the final anode of the television display tube. The first-mentioned energy is substantially constant, but the second energy is not constant because it is dependent on the energy derived from the EHT generator and therefore on the beam current in the display tube. As a result the said delay period is not constant, but is dependent on the luminosity on the screen of the display tube and therefore on the contents of the picture to be displayed. This period and the duration of the line flyback pulse may therefore vary from line to line. However, as this pulse is used as a reference signal for the indirect synchronization it is evident from the foregoing that this results in shifts of the written lines relative to one another as a function of the luminosity. As a result, for example, vertical straight lines are displayed crooked.

The error described could in principle be eliminated by the synchronizing circuit provided, however, that this circuit can react very rapidly to fast variations which would have the drawback that its interference sensitivity to incoming signals would become too large. The object of the invention is to provide means with which the advantages of the indirect synchronization are maintained and with which there is no detrimental effect due to the variation in the delay period and to this end the line time base according to the invention is characterized in that in order to prevent shifts as a function of the load on the line time base of the lines written on the screen the line time base includes a second line synchronising circuit provided with a second comparison stage, a second low-pass filter and a second oscillator, which second oscillator generates a second reference signal which is compared in frequency and/or in phase in the second comparison stage with the signal generated by the first oscillator so as to obtain a fixed phase relationship in the synchronized state of the second line synchronizing circuit during the line scan period between the second reference signal and the signal generated by the first oscillator, the time constant of the second lowpass filter being many times shorter than the time constant of the first lowpass filter, the second oscillator driving the switching element through a driver stage.

In order that the invention may be readily carried into effect, some embodiments thereof will now be described in detail by way of example with reference to the accompanying diagrammatic drawings in which.

Figure 7A:
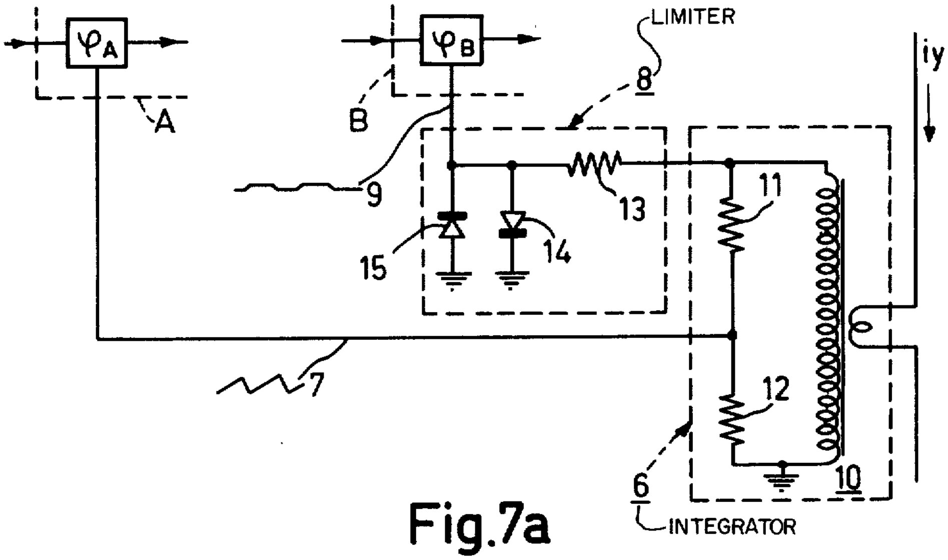
Figure 7B:
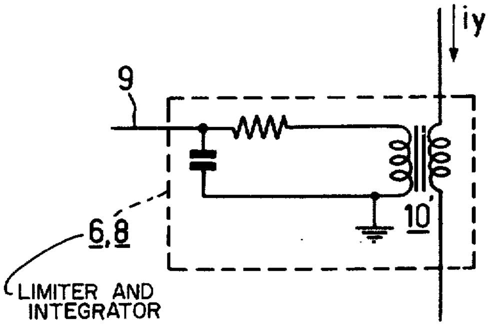
Figure 8:
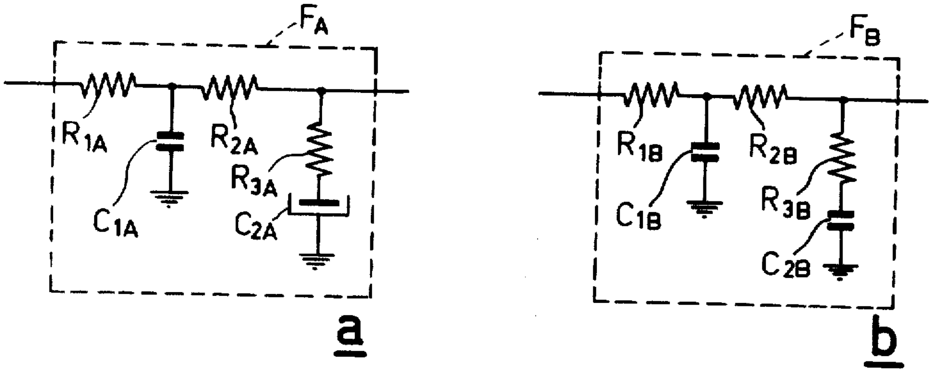
Figure 9:
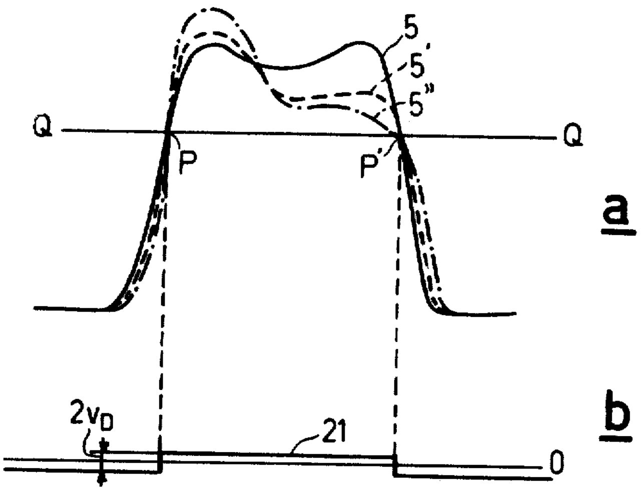

FIGS. 7*a* and 7*b*, 8, and 10 show parts of the line time base according to the invention and FIG. 9 shows waveforms which occur in the line time base according to the invention.

Figure 1:
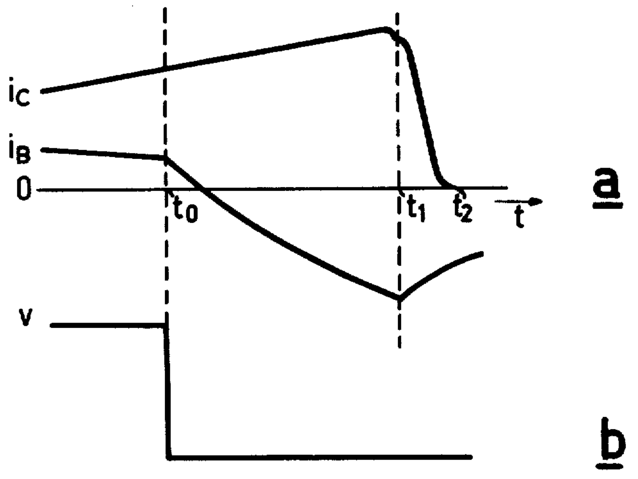
FIG. 1 shows voltage and current waveforms occurring in an EHT transistor.

In FIG. 1*a* the current $i_C$ and $i_B$ which flow in the collector and base electrodes of a line output transistor in a television receiver, are plotted as a function of time, in which the transistor can stand very high voltage as is the case, for example, with the Philips types BU 105 or BU 108. Here a known step is used so as to deplete the excess charge carriers present in the transistor in a comparatively fast manner, i.e. the use of a coil between the base of the transistor and the secondary winding of a driver transformer which provides a switching voltage $v$ shown in FIG. 1*b*. At the instant $t_0$ a trailing edge occurs at switching voltage $v$ which edge is to cut off the transistor. Current $i_B$ then decreases, reverses its direction and reaches a maximum negative value at the instant $t_1$. The transistor is then no longer saturated and current $i_C$ in turn decreases rapidly and becomes zero at the instant $t_2$. All this is described in greater detail in said U.S. patent.

At the instant $t_1$, approximately 10 $\mu$s after instant $t_0$, the commencement of the flyback period is initiated. During that period a flyback pulse is produced in the line time base, for example, in a line transformer which is coupled to the line output transistor, which flyback pulse is used as a reference signal so as to establish the indirect synchronization. This pulse is compared in frequency and/or phase with the received line synchronizing pulse, for example, in a phase discriminator which generates a control voltage to influence the frequency and/or the phase of the line oscillator of the receiver. For satisfactory display of the picture, instant $t_1$ must therefore be constant from line to line.

Figure 2:
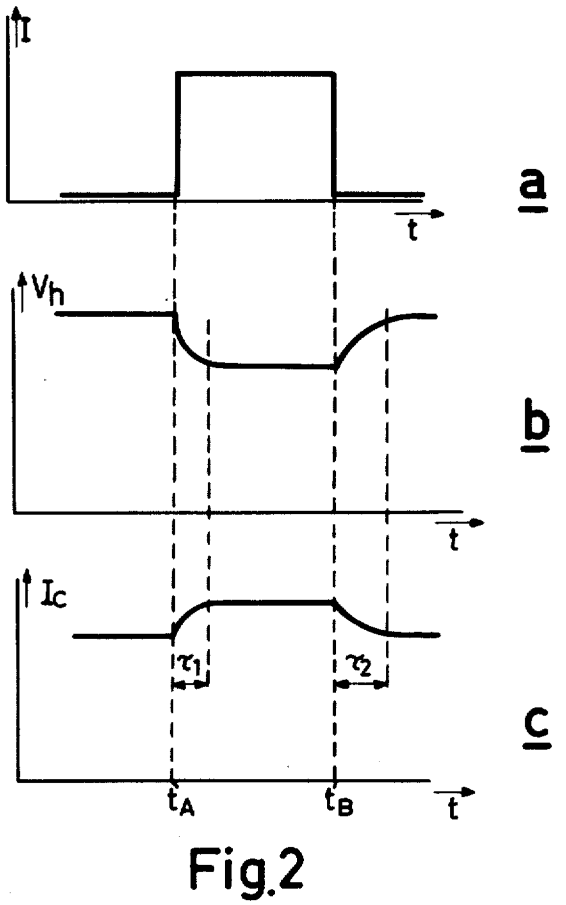
FIG. 2 shows waveforms to explain the invention.

However, since the line transformer also generates the EHT for the acceleration anode of the picture tube, the delay period of switching off the line output transistor, i.e. the time interval between instants $t_0$ and $t_1$, is not constant. This may be explained with reference to FIG. 2*a* in which the variation of the envelope I of the beam current in the picture tube is shown for a number of lines, with reference to FIG. 2*b* in which that of the high voltage $V_h$ is shown and with reference to FIG. 2c in which that of the envelope $I_C$ of the maximum values of collector current $i_C$ is shown. When the luminosity of the displayed picture increases at an instant $t_A$, the envelope I increases. The load on the EHT generator is larger so that high voltage $V_h$ decreases. This decrease is, however, not effected immediately but gradually because the conducting coating of the picture tube has quite a considerable capacitance to earth. When the beam current remains at a high level for a comparatively long period $\tau_1$ in the order of 10 or more line periods, high voltage $V_h$ no longer varies. In a corresponding manner a decrease in the beam current after an instant $t_B$ produces a gradual increase of high voltage $V_h$ during a period $\tau_2$. Envelope $I_C$ has the same variation as high voltage $V_h$ but is reversed while current $i_B$ does not change. As a result the voltage between the collector and emitter becomes higher and the transistor is overdriven to a lesser extent so that the delay period of switching off becomes gradually shorter during period $\tau_1$, subsequently remains constant and becomes gradually longer after instant $t_B$ during period $\tau_2$. Since instant $t_o$ is constantly determined by the driver stage preceding the line output transistor, this causes a gradual shift to the left and to the right of the lines written on the screen during the period $\tau_1$ and $\tau_2$, respectively. As a result vertical straight lines are displayed crooked. It is evident from the foregoing that instant $t_1$ is not usable for line synchronizing purposes. The circuit arrangement shown in a block schematic diagram in FIG. 3 provides a solution to this problem.

Figure 3:
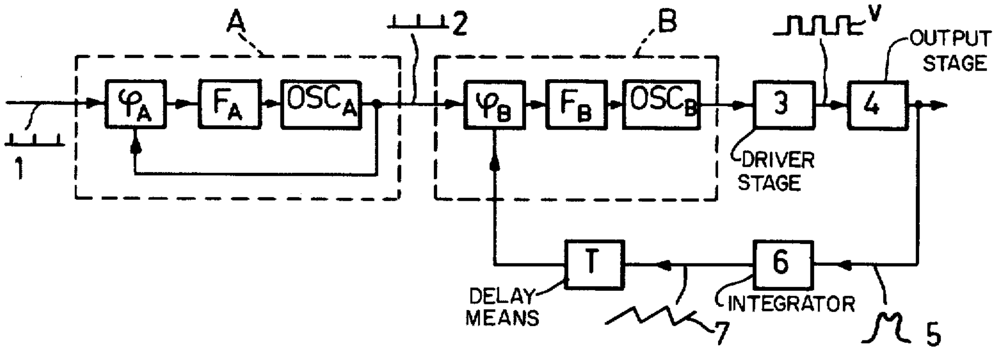
FIG. 3 shows an embodiment of the line time base according to the invention.

The section A in FIG. 3 represents a known circuit for the indirect synchronization with a phase comparator $\phi_A$, a lowpass filter $F_A$ and a line oscillator $OSC_A$. Section A produces a pulsatory voltage 2 which is free from noise and interference from the line synchronizing pulses 1 received from the transmitter, which pulsatory voltage is compared with pulses 1 in phase comparator $\phi_A$ so that they are in a fixed phase relationship with pulses 1 and are applied to the section B. Section B is also a circuit for the indirect synchronization with corresponding elements $\phi_B$, $F_B$ and $OSC_B$ in which, however, the time constant of filter $F_B$ is many times shorter than that of filter $F_A$. Oscillator $OSC_B$ drives a driver stage 3 which applies the switching voltage $v$ of FIG. 1b to line output transistor 4. The line flyback pulse 5 generated by transistor 4 is integrated by an integrator 6 and the obtained sawtooth voltage 7 is applied to a delay element T so that it undergoes a delay of approximately half a line period, i.e. 32 $\mu$s when the line period is 64 $\mu$s (625 lines per raster). The delayed voltage serves as a reference voltage for phase comparator $\phi_B$.

FIGS. 4a and 4b show the shapes of the two waveforms applied to phase comparator $\phi_B$, to wit the delayed sawtooth voltage and the pulsatory voltage 2, respectively. Due to the known action of phase comparator $\phi_B$ it is ensured that the frequency and/or the phase of the signal generated by oscillator $OSC_B$ is readjusted in such a manner that the pulses of FIG. 4b every time occur at a fixed instant relative to the waveform of FIG. 4a. Unlike known arrangements the control loop is adjusted in such a manner that this is the instant $t_M$ in the middle of the scan period. The sensitivity of phase comparator $\phi_B$ is less than in the known comparison circuits because the sawtooth varies approximately five times less steeply during the scan period than during the flyback period. This is offset by the fact that the pulses of FIG. 4b are free from noise and interference. The same sensitivity may otherwise be obtained in a simple manner by amplifying the reference voltage five times. In this manner it is achieved that the central vertical line on the screen of the picture tube (not shown) is shown straight, even when the flyback period varies as a result of variations in luminosity. A known step to render the horizontal deflection independent of the EHT variations, hence of the picture content, is to ensure that the deflection current undergoes a relative variation which is always half that of the relative variation of the EHT. If this step is used in this case, the other vertical straight lines are also actually shown as straight lines. It is true that the beginning and/or the end of some lines may remain slightly shifted relative to corresponding points of adjacent lines, but this effect is not very disturbing. If necessary, the first and last millimetres of the written lines may be made invisible behind a mask.

It is to be noted that parts 6 and T in FIG. 3 may be interchanged or pulses 2 instead of line flyback pulses 5 may be delayed. Delay element T may be any known arrangement, for example, a monostable multivibrator. It will be evident that the delay introduced by delay element T must be such that the pulses of FIG. 4b occur exactly at instant $t_M$. In fact, the line deflection current may be modulated, for example, for an East-West correction but usually there is no modulation in the middle of the scan period.

Figure 5:
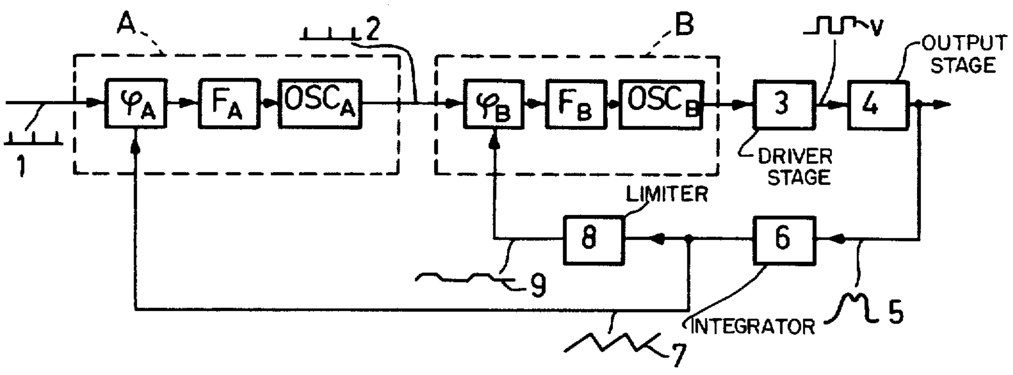
FIG. 5 shows a second embodiment of the line time base according to the invention.

FIG. 5 shows an embodiment in which a delay element need not be used. In this embodiment A and B denote the same circuits for the indirect synchronization as those in FIG. 3 and here they are also arranged in cascade. Furthermore integrator 6 is also present for generating sawtooth voltage 7. Voltage 7 is applied to a symmetrical limiter 8 whose output conveys a voltage 9.

Figure 6:
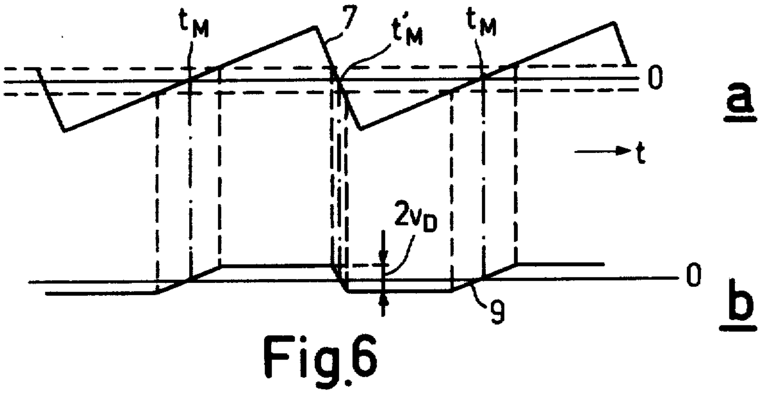
FIG. 6 shows waveforms occurring therein.

FIG. 6 shows voltages 7 and 9. Limiter 8 symmetrically cuts off voltage 7 on either side of its mean value so that the oblique edges of voltage 9 are symmetrical relative to the central instants $t_M$ and $t'_M$ of the scan and flyback periods, respectively, of voltage 7. Voltage 9 is applied as a reference signal to phase comparator $\phi_B$ while voltage 7 is applied as a reference signal to phase comparator $\phi_A$. The control direction of the phase comparators in conjunction with the relevant control loop is chosen to be such that phase comparator $\phi_A$ reaches its adjusting point when pulse 1 occurs at instant $t'_M$ while phase comparator $\phi_B$ reaches its adjusting point when pulse 2 occurs at instant $t_M$. The adjusting point is to be understood to mean the point to which the phase comparator will be readjusted as closely as possible. In this manner the delay of approximately half a line period obtained with the embodiment of FIG. 3 is now produced automatically while also the central instants of the flyback periods are maintained constant.

Parts 6 and 8 may be formed as is shown in FIG. 7a. The primary winding (for example, one turn) of a transformer 10 is arranged in series with the line deflection coil (not shown) and the sawtooth line deflection current $i_Y$ flows therethrough. Thus a sawtooth voltage is produced across the secondary winding (for example, 44 turns) of transformer 10 and across the series arrangement of two resistors 11 and 12 which series arrangement is connected in parallel thereacross. Elements 10, 11 and 12 have the same function as integrator 6 of FIG. 5. The voltage across resistor 12 is voltage 7 and is applied to comparator $\phi_A$. The value of resistor 11 is approximately four times larger than that of resistor 12, for example, 82 ohms and 22 ohms, respectively, so that the voltage present across the secondary winding of transformer 10 has a peak-to-peak amplitude which is approximately five times larger than that of voltage 7, i.e. with the given numbers this is approximately 15 V and 3 V, respectively, for $i_Y \approx 6{,}6$ A. As a result discriminator $\phi_B$ has the same sensitivity during the scan period as comparator $\phi_A$ has during the flyback period and may be formed in an identical manner. However, since the voltage present across the secondary winding of transformer 10 is too high before and after instant $t_M$, it is necessary to limit this voltage before it is applied to comparator $\phi_B$. This also applies to the embodiment according to FIG. 3. A resistor 13 and two diodes 14 and 15 whose cathode and anode, respectively, are connected to earth constitute limiter 8 at which voltage 9 is present. This voltage is applied to comparator $\phi_B$ and has a peak-to-peak amplitude of $2v_D$ in which $v_D$ is the threshold voltage of a diode (approximately 0.7 V for silicon diodes). As a result the sensitivity of comparator $\phi_B$ remains unchanged because the slope of voltage 9 about instant $t_M$ is the same as the voltage present across the secondary winding of transformer 10.

A further embodiment of parts 6 and 8 is shown in FIG. *7b*. In this Figure a transformer 10' having a saturable core is used through which the flux has a variation which is uniform to that of waveform 9. A voltage which is the derivative of the flux as a function of time is produced across the secondary winding. After integration by an RC network voltage 9 is thus obtained.

Figure 4:
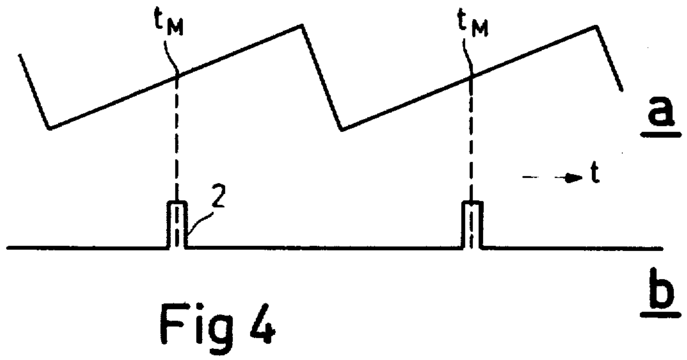
FIG. 4 shows waveforms occurring therein.

In a practical embodiment of the circuit arrangement according to FIG. 4 filters $F_A$ and $F_B$ as shown in FIG. 8 are used and have approximately the following values:

| | |
|---|---|
| $R_{1A}$ = 100 ohms | $R_{1B}$ = 100 ohms |
| $R_{2A}$ = 15 K ohms | $R_{2B}$ = 15 K ohms |
| $R_{3A}$ = 330 ohms | $R_{3B}$ = 22 K ohms |
| $C_{1A}$ = 47 nF | $C_{1B}$ = 15 nF. |
| $C_{2A}$ = 10 $\mu$F | $C_{2B}$ = 330 nF. |

It will be evident that the time constant of filter $F_A$ is substantially determined by $R_{2A}$ and $C_{2A}$, i.e. approximately 150 ms, while the time constant of filter $F_B$ is substantially determined by $R_{2B}+R_{3B}$ and $C_{2B}$, i.e. approximately 12 ms, that is to say approximately 12.5 times shorter than the first time constant. This has been found to be sufficiently short in view of the integrating effect of the capacitive load on the EHT generator. A too short time constant might result in instability.

The circuit according to FIG. 5 operates as follows. Initially both oscillators oscillate freely. Section B is the first to pull in while oscillator $OSC_B$ is retained by oscillator $OSC_A$. Phase comparator $\phi_A$ then receives a reference signal 7 so that section A also pulls in. Section B closely follows all variations of section A and reacts rapidly to the phase errors caused by luminosity variations while section A is too slow for this. Due to the action of both comparators pulses 2 are adjusted in the middle of the scan of voltage 7 while the trailing edge of switching voltage $v$ occurs approximately 10 $\mu$s prior to the commencement of the flyback of voltage 7.

It will be noted that the signal generated by oscillator $OSC_A$ may be alternatively sawtooth-shaped. The second signal applied to phase comparator $\phi_B$ is then to be pulsatory so that integrator 6 may be omitted.

A remaining error which occurs in the circuit arrangement according to FIG. 5 is the following. When the luminosity has a given value over a number of lines and is followed by a completely different value which is the case when, for example, the picture to be displayed includes a horizontal black bar followed by a horizontal white bar, comparator $\phi_A$ reacts to this comparatively slow variation. The phase of voltage 2 is then incorrect which results in a shift of the lines written on the screen after the horizontal transition.

However, it has been found that when the line time base is satisfactorily synchronized with the received line synchronizing pulses, the line flyback pulses undergo a distortion for a long time in case of a loaded EHT generator, but the time interval during which the pulses exceed one given value is constant and substantially independent of the load. FIG. *9a* shows three waveforms in which 5 denotes a flyback pulse in the unloaded condition while 5' and 5'' denote the same pulse at different loads. It has been found by experiment that curve 5, 5' and 5'' intersect each other at substantially the same points P and P' which are located on one and the same horizontal line Q—Q. It is evident from FIG. *9a* that the time interval between points P and P' is substantially constant. It is possible to utilize this in order to obtain a somewhat reliable reference signal for phase comparator $\phi_A$.

Figure 10:
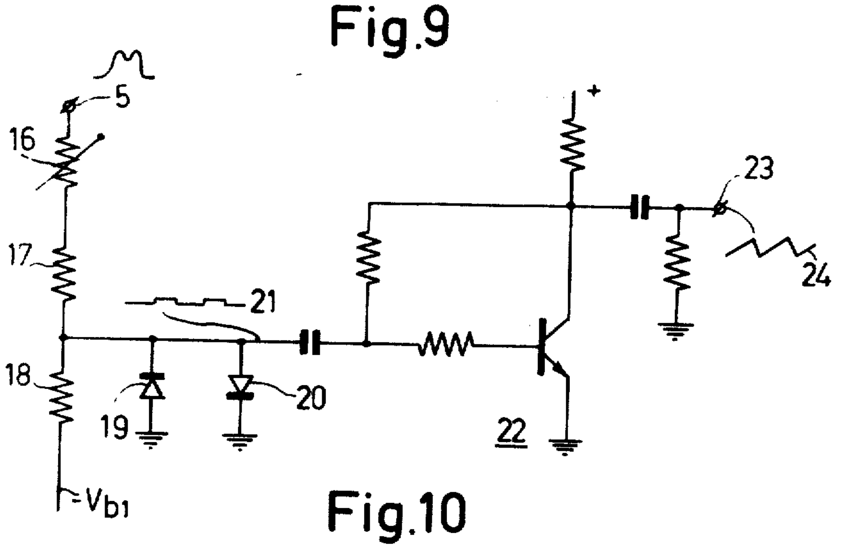

One possible embodiment of this principle is diagrammatically shown in FIG. 10. An adjustable resistor 16 and two fixed resistors 17 and 18 are arranged in series between a point of the line transformer (not shown) at which positively directed line flyback pulses 5 are present and a direct voltage source $-V_{b1}$ which is negative relative to earth. A symmetrical limiter formed with two diodes 19 and 20 is arranged between the junction of resistors 17 and 18 and earth. A squarewave voltage 21 having a peak-to-peak amplitude of $2v_D$ is produced at the said junction. The level at which the flyback pulses are cut off with the aid of the symmetrical limiter at the level which corresponds to that of points P and P' in FIG. *9a* can be adjusted with the aid of variable resistor 16 and the choice of voltage $-v_{b1}$. The voltage 21 shown in FIG. *9b* has positively directed pulses whose duration and amplitudes are substantially constant. A condition therefore is that the amplitude of the flyback pulse which would be produced at the said junction in the absence of the two diodes is high relative to voltage $2v_D$, which imposes conditions on the proportioning of resistors 16, 17 and 18. Voltage 21 drives a Miller integrator 22 whose output 23 conveys a sawtooth voltage 24 which may be applied to phase comparator $\phi_A$ because it has an amplitude and a flyback period which are always constant, hence independent of the picture content. The circuit arrangement of FIG. 10 thus replaces integrator 6. Voltage 24 instead of voltage 9 may alternatively be applied without any objection to phase comparator $\phi_B$ provided that it is firstly amplified by approximately five times. A possible phase variation of voltage 21 is rapidly corrected by section B so that the reference signal for section A no longer has any phase variations. It will be evident that voltage 24 may alternatively be applied to phase comparator $\phi_B$ in the embodiment of FIG. 3.

It is to be noted that the circuit arrangement according to the invention may alternatively be used in cases other than for EHT transistors and/or in cases where interferences occur in the line output stage whereby the possibility of correction of the line synchronization as a function of the output signal is desirable. Such interferences may be caused by variations in the line output stage, for example, as a result of temperature, and tolerances of components.

What is claimed is:

1. A circuit for synchronizing a sawtooth output signal of a television line output stage in accordance with a pulsatory line synchronization signal, said circuit comprising said television line output stage comprising sweep means for producing said sawtooth output signal; a first synchronizing circuit including a first phase comparison stage having inputs for respectively receiving said synchronization signal and a first reference signal, a first low pass filter means having a first time constant coupled to said comparison stage and a first oscillator means coupled to said low pass filter means for producing a pulsatory output signal; and means for eliminating phase shifts due to load variations on said line stage comprising a second synchronizing circuit including a second phase comparison stage having a first input means coupled to said first low pass filter to receive said pulsatory output signal and a second input means for receiving said sawtooth output signal, and a second low pass filter having a second time constant substantially smaller than said first time constant and coupled to said second comparison stage, and control means responsive to said second low pass filter to control said sweep means, said second synchronizing circuit having a synchronized state wherein said pulsatory output signal pulses substantially occur at the middle of said sawtooth signal.

2. A circuit as claimed in claim 1 wherein said second time constant is less than one tenth of said first time constant.

3. A circuit as claimed in claim 1 wherein the ratio of the amplitudes of said second to said first reference signals is substantially equal to the ratio of the line scan period to the line flyback period of said sawtooth output signal.

4. A circuit as claimed in claim 1 further comprising means coupled between said first oscillator and said first comparison stage for deriving said first reference signal from said first oscillator, and means coupled to one of said second comparison stage inputs for delaying one of the received signals by substantially one half of a line period.

5. A circuit as claimed in claim 4 wherein said delay means has an input means for receiving said second reference signal and an output coupled to said second comparison stage.

6. A circuit as claimed in claim 1 wherein said sweep means comprises a switching element switching at the frequency of said sawtooth output signal, and said control means comprises a second oscillator having an input coupled to said second filter and an output coupled to said switching element.

7. A circuit as claimed in claim 6 further comprising means coupled to said second oscillator and to both of said comparison stages for deriving both of said reference signals from said second oscillator, and wherein said first and second synchronizing circuits have synchronization instants during the line flybacks and line scan periods respectively.

8. A circuit as claimed in claim 6 wherein said element comprises a high voltage transistor.

9. A circuit as claimed in claim 1 further comprising means means coupled to said second input means for symmetrically limiting said sawtooth signal.

10. A circuit as claimed in claim 9 wherein said limiting means comprises a pair of diodes, each of said diodes having a pair of unlike electrodes, electrodes of one diode being coupled to the unlike electrodes of the remaining diode.

11. A circuit as claimed in claim 9 wherein said limiting means comprises a transformer having a saturable core and an integrator coupled to said transformer.

* * * * *